(12) United States Patent
Cohen et al.

(10) Patent No.: US 7,911,083 B2
(45) Date of Patent: Mar. 22, 2011

(54) METHODS AND SYSTEMS FOR DISTRIBUTING LOAD TRANSFERS IN POWER SUPPLY SYSTEMS

(75) Inventors: Daniel C. Cohen, Newton, MA (US); David A. Colucci, Lynnfield, MA (US); James S. Spitaels, Shrewsbury, MA (US); Mark R. Melanson, Chelmsford, MA (US)

(73) Assignee: American Power Conversion Corporation, West Kingston, RI (US)

( * ) Notice: Subject to any disclaimer, the term of this patent is extended or adjusted under 35 U.S.C. 154(b) by 233 days.

(21) Appl. No.: 12/195,690

(22) Filed: Aug. 21, 2008

(65) Prior Publication Data

US 2010/0045107 A1  Feb. 25, 2010

(51) Int. Cl.
*H02J 7/00* (2006.01)
*H02J 9/00* (2006.01)

(52) U.S. Cl. ............................. 307/64; 307/81
(58) Field of Classification Search .............. 307/64–66, 307/81
See application file for complete search history.

(56) References Cited

U.S. PATENT DOCUMENTS

| | | |
|---|---|---|
| 4,611,289 A | 9/1986 | Coppola |
| 5,019,717 A | 5/1991 | McCurry et al. |
| 5,319,571 A | 6/1994 | Langer et al. |
| 6,191,500 B1 | 2/2001 | Toy |
| 6,317,346 B1 | 11/2001 | Early |
| 7,015,599 B2 | 3/2006 | Gull et al. |
| 7,082,541 B2 | 7/2006 | Hammond et al. |
| 2003/0033550 A1 | 2/2003 | Kuiawa et al. |
| 2003/0048005 A1 | 3/2003 | Goldin et al. |
| 2003/0048647 A1 | 3/2003 | Sadler et al. |
| 2005/0071699 A1 | 3/2005 | Hammond et al. |
| 2005/0201127 A1 | 9/2005 | Tracy et al. |
| 2007/0216229 A1 | 9/2007 | Johnson, Jr. et al. |
| 2007/0278860 A1* | 12/2007 | Krieger et al. .................. 307/64 |

FOREIGN PATENT DOCUMENTS

WO   2007/139577 A1   12/2007

OTHER PUBLICATIONS

"Static Three-Phase Uninterruptible Power Supply System—Free Standing," UPS Guide Specifications, Apr. 2003, pp. 1-14, XP002554714.
International Search Report for PCT/US2009/054448 mailed Dec. 3, 2009.

* cited by examiner

*Primary Examiner* — Fritz M Fleming
*Assistant Examiner* — Carlos Amaya
(74) *Attorney, Agent, or Firm* — Lando & Anastasi, LLP

(57) ABSTRACT

A power supply system includes an AC power line with an uninterruptible power supply (UPS) device coupled to receive power from the AC power line. The UPS includes control circuitry that couples power conversion circuitry of the UPS to the AC power line when the available AC power is acceptable. The power supply system also includes a second UPS device coupled to receive power from the AC power line. The second UPS includes a timer delay, such that the control circuitry is configured to couple power conversion circuitry to the AC power line when the available AC power is acceptable, and upon expiration of the timer.

9 Claims, 5 Drawing Sheets

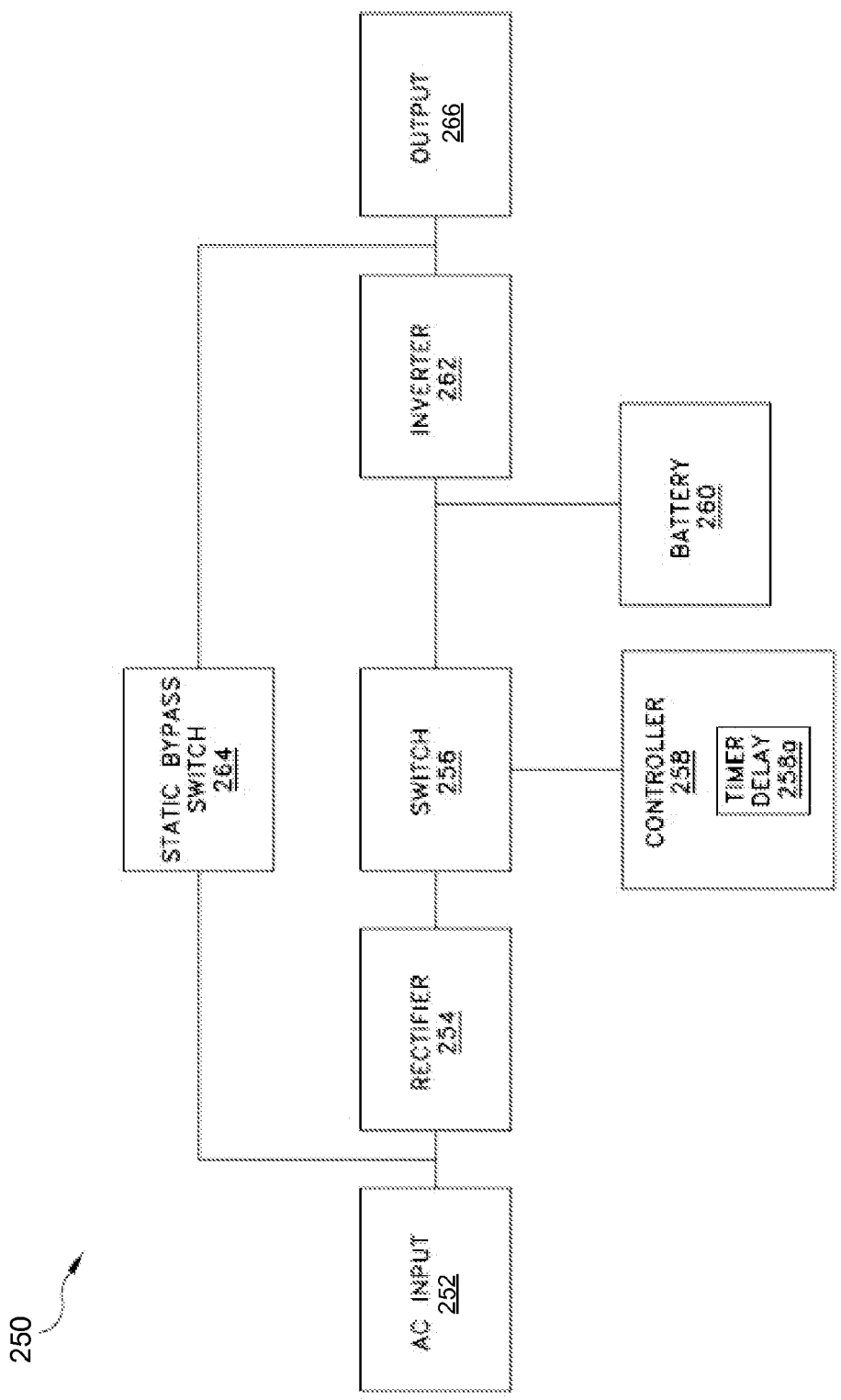

US 7,911,083 B2

METHODS AND SYSTEMS FOR DISTRIBUTING LOAD TRANSFERS IN POWER SUPPLY SYSTEMS

BACKGROUND OF INVENTION

1. Field of Invention

Embodiments of the invention relate generally to power management, and more specifically to methods and systems for preventing power failure from large inrush current simultaneously drawn by multiple power loads.

2. Discussion of Related Art

Today's companies and persons rely on having power more than ever before. Without power, companies may be unable to manufacture goods, or to operate at all, such as if the company is in the business of supplying information over the Internet. Without power, businesses and individuals may be completely incapacitated regarding critical activities, such as making goods, providing services, and transacting personal finances (e.g., filing tax returns, and paying bills).

With such a heavy reliance on power, individuals and companies frequently need to be able to have power outages corrected in short order, and/or have backup power supplies so that their affairs and/or businesses are not significantly affected, and/or be notified when power fails. Correcting power outages typically involves calling a local power company to report a power outage and/or troubleshooting a local power supply/conveyance system, e.g., internal to a company or residence, that has gone out. Uninterruptible power supplies (UPSs) are often used to provide backup power in case of a power outage. A UPS provides surge protection and backup battery power for electronic systems. Backup battery power helps prevent loss of data that can occur during a blackout, a brownout (low voltage), or a spike or a surge of electricity through the system. UPSs are commonly used on computing equipment to guard against data being lost due to a power outage before the data are saved. UPSs used with computing equipment also help to guard against a loss in service by providers of information over the Internet, such as by servers, e.g., hosting web pages. UPSs can also help improve availability of network infrastructure in the home during power outages, protect against data loss on personal computers, etc.

SUMMARY OF INVENTION

A facility that has numerous UPS deployed will back up the power for multiple loads, and a number of UPS will connect to a shared line power. During a power outage all the UPS will continue to supply power to their loads. When the power returns, typically all UPS will attempt to connect to the line power simultaneously, this will cause a step load increase on the incoming source as the loads all turn on simultaneously. A large step load increase could potentially cause the input power to fail again. Generally, having a large number of UPS devices instantaneously connect to any power supply source, such as a back up power generator, can create a sudden step load increase, also referred to as inrush current or input surge current, causing failure in the power supply.

At least one embodiment of the invention provides a power supply system that includes an AC power line with a plurality of uninterruptible power supply (UPS) devices coupled to receive power from the AC power line. A first UPS includes control circuitry that couples power conversion circuitry of the UPS to the AC power line when the available AC power is acceptable. The power supply system also includes a second UPS device coupled to receive power from the AC power line. The second UPS includes a timer delay, such that the control circuitry is configured to couple power conversion circuitry to the AC power line when the available AC power is acceptable, and upon expiration of the timer.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2B is a block diagram of another embodiment of a UPS device that may be used on the system of FIG. 1 according to principles of the invention.

DETAILED DESCRIPTION

Figure 1:
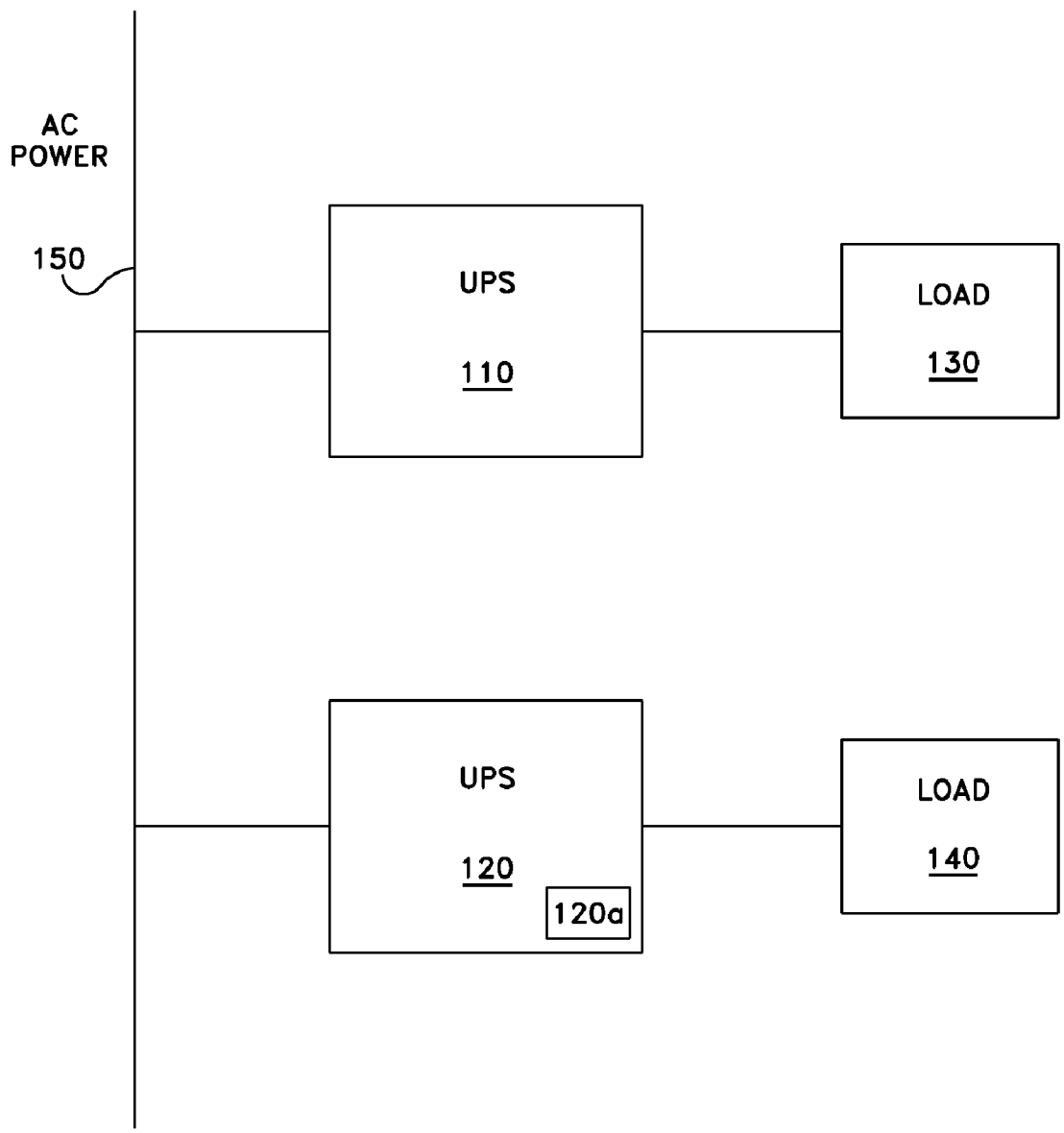
FIG. 1 is a system diagram of a power supply system according to principles of the invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

FIG. 1 illustrates a power supply system according to principles of the invention. The system includes an AC power line 150 that provides power with a first uninterruptible power supply (UPS) 110 device coupled to a load 130. A second UPS device 120 also provides power from the AC power line 150 to a load 140. The UPS devices 110, and 120 contain control circuitry configured to selectively convert and supply power from the external AC power source 110 or an internal battery pack (not shown in FIG. 1) to their respective loads 130, 140 with desired voltage characteristics (e.g., voltage) as directed by a control circuit of power circuitry contained within each UPS. The second UPS device 120 further contains a timer delay 120a, that may delay the switching of the power source by the control circuitry.

During a power outage the UPS devices will continue to supply power to their loads by transferring stored power from the internal battery pack, or other energy storage means, such as a flywheel, or capacitor bank. Upon sensing that the available AC power becomes acceptable, the control circuitry of the UPS devices couple power conversion circuitry of the UPS devices 110, 120 to the AC power line 150 when the available AC power is acceptable. When the power returns, typically all UPS devices will attempt to connect to the line power simultaneously, causing a step load increase on the incoming source as the loads all turn on simultaneously. This step load increase, also referred to as inrush current or input surge current, may cause the input power to fail again. According to principles of the invention, the second UPS includes a timer delay, such that the control circuitry is configured to couple power conversion circuitry to the AC power line when the available AC power is acceptable, and upon expiration of the timer. By staggering the connections of the UPS devices 110, 120 to the AC power line 150, a sudden inrush current may be avoided, thus avoiding an overload of the AC power.

On of ordinary skill in the art will understand that multiple UPS devices may connect to a single AC power line, and that several off-line devices may reconnect back to the AC power line simultaneously without causing an overload. With larger numbers of UPS devices, groups of UPS devices may be reconnected in groups, and at different intervals of time. In embodiments of the present invention, the timer delay between the connection of a first UPS (or group of UPS devices) and a second UPS (or group of UPS devices) to the power line may be between 8 and 12 seconds. The delay is short enough so that it is functionally imperceptible to users of the system, but significant enough to prevent a simultaneous inrush. In other embodiments, other delay times may be used.

The UPS devices may further contain other circuitry, such as battery monitor units to monitor voltage and temperature of the batteries in the battery pack, and communication units to provide this information to the control circuit via a controller area network (CAN) bus.

Figure 2A:
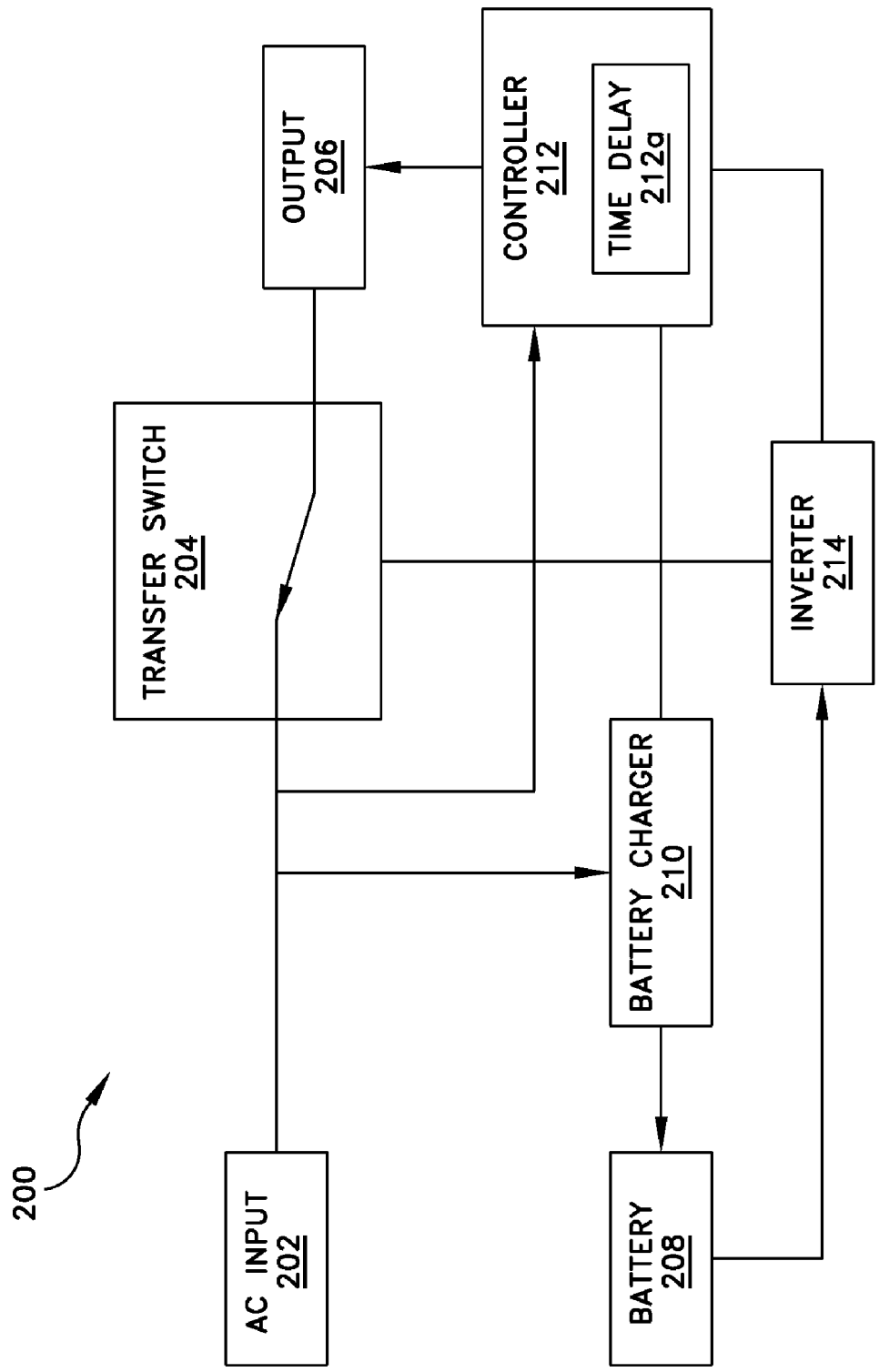
FIG. 2A is a block diagram of an embodiment of a UPS device that may be used in the system of FIG. 1 according to principles of the invention.

FIG. 2A illustrates a UPS 200 that may be used in connection with the system of FIG. 1. UPS 200 includes an AC input 202, a transfer switch 204, an output 206, a battery 208, a controller 212, and an inverter 214. The UPS 200 can include a battery charger 210, but need not. The AC input 202 is configured to couple to an AC power source and the output 206 is configured to couple to a load. The input 202 provides power received from the AC source to the transfer switch 204 and to the battery charger 210. The transfer switch 204 receives AC power from the input 202 or from the inverter 214. The inverter 214 receives DC power from the battery 108 and converts the DC power to AC power and provides the AC power to the transfer switch 204. The controller 212 determines whether power is to be provided from the AC input 202 or from the inverter 214 in accordance with allowable tolerances of the system. The controller 212 may further include a timer delay 212a, for example, a subroutine in an existing software module, a separate programmable software module, a Field Programmable Gate Array (FPGA), or separate hardware device, such that the control circuitry is configured to couple power conversion circuitry to the AC power line when the available AC power is acceptable, and upon expiration of a timer. The timer delay may be programmed as the UPS devices are manufactured, wherein one of several predetermined delay intervals may be selected at the time of manufacture. Alternatively, the UPS devices may be configured such that the timer delay of each UPS device may be manually programmed or re-programmed to one of several predetermined delay intervals.

FIG. 2B illustrates another UPS 250 configured with a double conversion topology that may be used in connection with the system of FIG. 1. UPS 250 includes an AC input 252, a AC/DC rectifier 254, a switch 256, a controller 258, a battery 260, a DC/AC inverter 262, a static bypass switch 264 and an output 266. The AC input 252 is configured to couple to an AC power source and the output 266 is configured to couple to a load. The input 252 provides power received from the AC source to the rectifier 254. The rectifier converts the AC power into DC power. In normal operations, the UPS 250 charges the battery 260 while supplying the output 266 with power via the inverter 262. If the AC-input supply voltage goes outside any preset tolerance or if it fails, the UPS can enter a stored energy mode wherein the battery 260 continues to supply power to the output 266 via the inverter 262. The controller 258 determines whether power is to be provided from the AC input 252 or the battery 260 in accordance with allowable tolerances of the system. The controller 258 may further include a timer delay 258a, for example, a subroutine in an existing software module, a separate programmable software module, an Field Programmable Gate Array (FPGA), or separate hardware device, such that the control circuitry is configured to couple power conversion circuitry to the AC power line when available AC power is acceptable, and upon expiration of a timer. Many UPS systems employing a double conversion topology further include a static bypass switch 264 that allows the AC input to provide power directly to the output under certain conditions, such as internal malfunction of the UPS, or load current transients (inrush or fault clearing). One of ordinary skill in the art will recognize that in some embodiments, the static bypass switch may also be controlled with a timer delay according to principles of the invention.

As with the UPS 200 of FIG. 2A, the timer delay of the UPS 250 in FIG. 2B may be programmed as the UPS devices are manufactured, wherein one of several predetermined delay intervals may be selected at the time of manufacture. Alternatively, the UPS devices may be configured such that the timer delay of each UPS device may be manually programmed or re-programmed to one of several predetermined delay intervals.

While FIGS. 2A and 2B illustrate UPS devices employing two different power conversion topologies, one of ordinary skill in the art will understand that principles of the present invention are not limited to those topologies, and may be applied to other UPS conversion topologies, or other power conversion topologies.

Figure 3:
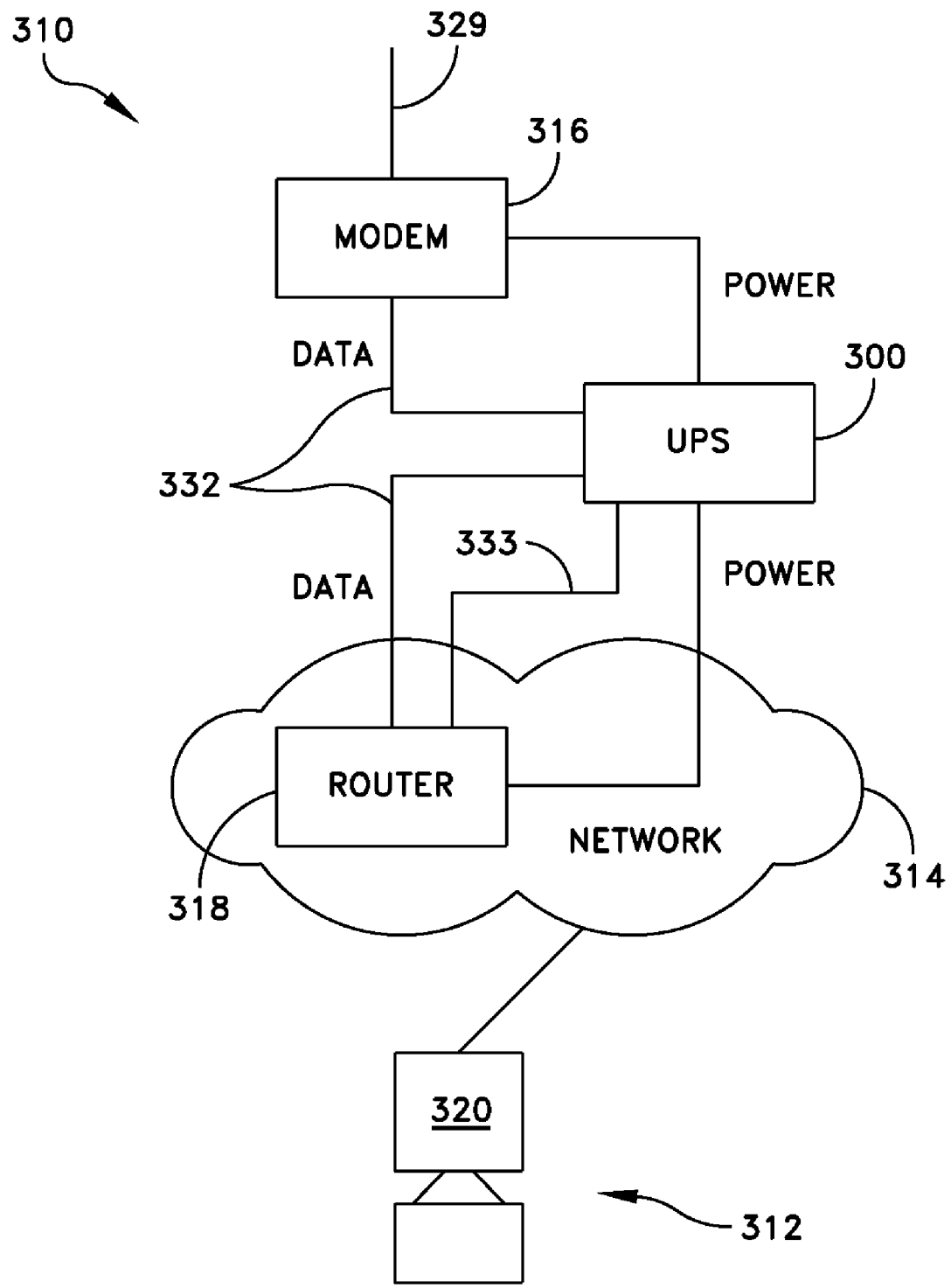
FIG. 3 is a simplified diagram of a communications network and a UPS connected to the network.

In yet another power supply system in accordance with principles of the invention, UPS devices may be networked together, wherein a networked interface or controller may set the delay interval between sensing available AC power and reconnecting to the AC power of individual UPS devices. FIG. 3 illustrates a computer 312 and a UPS device 300 that may be used in such a system.

Referring to FIG. 3, an uninterruptible power supply (UPS) monitoring and control system 310 comprises a computer 312, a communication network 314, a UPS 300, and UPS-supported equipment including a modem 316 and a router (or switch or hub) 318. The network 314 is preferably a packet-switched network such as an Ethernet local area network (LAN), although other networks would be acceptable. The UPS 300 is configured to communicate with the computer 312 via the network 314 directly or through the router 318. Thus, in the discussion below, reference to communication between a UPS 300 and a computer 312 may be through the router 318 although the router 318 may not be specifically mentioned.

As shown in FIG. 3, a cable 329 (e.g., a coaxial cable) for data communication to an external network such as the Internet is connected to the modem 316 (e.g., a cable modem). An Ethernet line 332 connects the modem 316 with the router 318, possibly passing through surge protection circuitry in the UPS 300. A line 333 connects the router 318 and the UPS 300 for transferring communications, e.g., commands, from the router 318 to the UPS 300. The router 318 is further coupled to the computer 312 and the UPS 300 through Ethernet lines of the network 314. The UPS 300 is configured to provide backup power to the equipment 316, 318 and to provide information regarding use of the backup power via the network 314 to the computer 312. The computer 312 includes a display screen 320 for displaying an interface to show the information regarding use of the backup power provided by the UPS 300 to a user of the computer 312.

Figure 4:
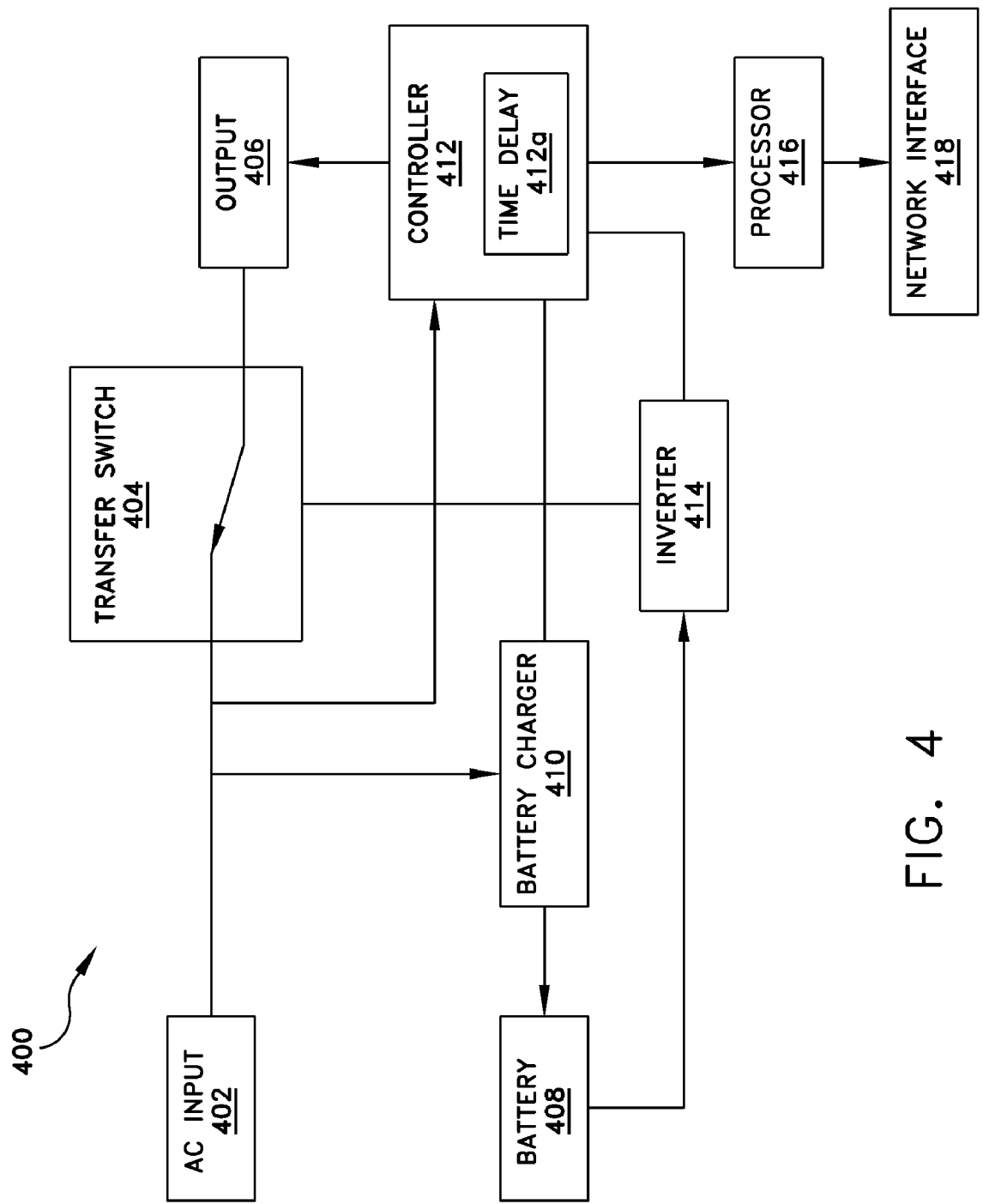
FIG. 4 is a block diagram of an embodiment of a UPS device that may be used in the system of FIG. 3 according to principles of the invention.

Referring to FIG. 4, with further reference to FIG. 3, a UPS 400, that may be used as UPS 300 in FIG. 3 includes an AC input 402, a transfer switch 404, an output 406, a battery 408, a controller 412, and an inverter 414. The UPS 400 can include a battery charger 410, but need not. The AC input 402 is configured to couple to an AC power source and the output 406 is configured to couple to a load. The input 402 provides power received from the AC source to the transfer switch 404 and to the battery charger 410. The transfer switch 404 receives AC power from the input 402 or from the inverter 414. The inverter 414 receives DC power from the battery 408 and converts the DC power to AC power and provides the AC power to the transfer switch 404. The controller 412 determines whether power is to be provided from the AC input 402 or from the inverter 414 in accordance with allowable tolerances of the system 400. Depending on the capacity of the battery 408 and the power requirements of the load, the UPS 400 can provide power to the load during brief AC power source "dropouts" or for extended power outages. The UPS 400 is exemplary only and not limiting as other UPS configurations can be used with embodiments of the invention.

The UPS 400 further includes a processor 416 and a network interface 418. The processor 416 may be referred to as a slave processor, or simply a slave, and the controller 412, that includes a processor, may be referred to as a master processor, or simply a master. The master 412 is configured to monitor data regarding status parameters of the UPS 400 and to implement control commands to control operation of the UPS 400. The slave 416 is configured to relay information between the network interface 418 and the master processor 412. The master 412 and the slave 416 preferably operate without software, instead executing instructions in firmware. The slave 416 preferably can communicate with the master 412 at a rapid rate such as 9600 baud.

Similarly, a UPS employing a double conversion topology as illustrated in connection with FIG. 2B, or other conversion topologies (not shown) may be configured with a network interface and used in place of UPS 400.

The slave processor 416 includes embedded Ethernet capability. Using embedded Ethernet circuitry may help control the cost of the UPS 400, e.g., to make the UPS 400 desirable for home or small business use.

The master microprocessor 412 is configured to control various aspects of the UPS 400 independently or in accordance with instructions received from the slave 416 from the computer 312. The controller 412 is configured to determine when battery power is needed and to control the transfer switch 404 to provide power to the output 406 from either the AC input 402 and/or the battery 408, via the inverter 414, as appropriate. A processor in controller 412 is configured to perform its various functions by reading and executing computer-readable, computer-executable software instructions stored in a memory. The master 412 can further receive commands/instructions from the computer 312 via the network 414, the interface 418, and the slave 416 and control portions of the UPS 400 to implement the commands. For example, the timer delay 412a of the master 412 can be set through the computer 312 via the network 414, the interface 418, and the slave 416 such that the delay interval is programmed to one of several preprogrammed delay intervals.

Because the UPS devices may be networked with a centralized intelligent controller (such as computer 312), the centralized controller may keep track of the delay intervals of each of the UPS devices within the networked power supply system, and take into account those delays when setting assigning or reassigning timer delays for individual UPS devices within the system, such that the devices powering on the AC line at certain times are evenly distributed.

The storage systems used in connection with the controllers, processors, or timer delays may typically include a computer readable and writeable nonvolatile recording medium in which signals are stored that define a program to be executed by the processor or information stored on or in the medium to be processed by the program to perform one or more functions associated with embodiments described herein. The medium may, for example, be a disk or flash memory. Typically, in operation, the processor causes data to be read from the nonvolatile recording medium into another memory that allows for faster access to the information by the processor than does the medium. The invention is not limited to a particular memory system or storage system.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 312 is shown by way of example as one type of computer system upon which various aspects of the invention may be practiced, it should be appreciated that aspects of the invention are not limited to being implemented on the computer system as shown in FIG. 3. Computer system 312 may be a general-purpose computer system that is programmable using a high-level computer programming language. Computer system 312 may be also implemented using specially programmed, special purpose hardware.

The processor and operating system together define a computer platform for which application programs in high-level programming languages are written. It should be understood that embodiments of the invention are not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. For example, a computer system that determines available power capacity may be located remotely from a system manager. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP). For example, one or more database servers may be used to store device data, such as expected power draw, that is used in designing layouts associated with embodiments of the present invention.

It should be appreciated that the invention is not limited to executing on any particular system or group of systems. Also, it should be appreciated that the invention is not limited to any particular distributed architecture, network, or communication protocol.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A power supply system comprising:
   a power line;
   a first plurality of uninterruptible power supply (UPS) devices coupled to receive power from the power line, the first plurality of UPS devices including a first timer delay and control circuitry configured to couple power conversion circuitry to the power line when available power is acceptable and at expiration of the first timer delay;
   a second plurality of UPS devices coupled to receive power from the power line, the second UPS devices including a second timer delay, and control circuitry configured to couple power conversion circuitry to the power line when available power is acceptable and at expiration of the second timer delay, where a delay interval exists between the first timer delay and the second timer delay; and
   a controller configured to program the first timer delay and the second timer delay,
   wherein the controller is further configured to balance distribution of UPS devices programmed at the first timer delay and UPS devices programmed at the second timer delay.

2. The power supply system of claim 1 wherein the delay interval is between 8 seconds and 12 seconds.

3. The power supply system of claim 1 wherein the delay interval is 10 seconds.

4. A method of manufacturing UPS devices, the method comprising:
   manufacturing UPS devices coupled to receive power from an AC power line, the UPS devices including a timer delay, and control circuitry configured to couple power conversion circuitry to the AC power line when the available AC power is acceptable, and upon expiration of a delay time of the timer delay;
   programming the timer delay of individual UPS devices with one of a plurality of distinct delay times.

5. The method of claim 4, wherein manufacturing includes configuring the timer delay of the UPS devices to be changeable by an external controller.

6. A power supply system comprising:
   an AC power line;
   a plurality of UPS devices coupled to receive power from the AC power line, wherein each of the plurality of UPS devices includes a timer delay and control circuitry configured to couple power conversion circuitry to the AC power line when available AC power is acceptable and upon expiration of the timer delay; and
   a controller coupled to the plurality of UPS devices and configured to set the timer delay of a first group of the plurality of UPS devices to a first timer delay and the timer delay of a second group of the plurality of UPS devices to a second timer delay,
   wherein the controller is further configured to balance the first and second groups of the plurality of UPS devices so as to prevent an overload when available AC power is acceptable.

7. The power supply system of claim 6, wherein at least one of the first timer delay and the second timer delay is programmable.

8. The power supply system of claim 6, wherein at least one of the first timer delay and the second timer delay is factory programmed.

9. The power supply system of claim 6 wherein at least one of the plurality of UPS devices is configured with a double converter topology including an AC/DC rectifier and a DC/AC inverter.

* * * * *